(12) United States Patent
An et al.

(10) Patent No.: US 8,247,134 B2
(45) Date of Patent: Aug. 21, 2012

(54) FUEL CELL AND FUEL CELL SYSTEM WITH THE SAME

(75) Inventors: Seong-Jin An, Suwon-si (KR); Hee-Tak Kim, Suwon-si (KR); Seung-Shik Shin, Suwon-si (KR); Yeong-Chan Eun, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1069 days.

(21) Appl. No.: 11/540,854

(22) Filed: Sep. 28, 2006

(65) Prior Publication Data

US 2007/0072052 A1 Mar. 29, 2007

(30) Foreign Application Priority Data

Sep. 28, 2005 (KR) .................. 10-2005-0090432

(51) Int. Cl.
*H01M 2/38* (2006.01)
*H01M 2/40* (2006.01)
*H01M 8/04* (2006.01)
*H01M 8/10* (2006.01)
*H01M 8/24* (2006.01)

(52) U.S. Cl. ........ 429/514; 429/457; 429/458; 429/462; 429/483; 429/515

(58) Field of Classification Search ............... 429/30, 429/457–458, 462, 483, 513–515
See application file for complete search history.

(56) References Cited

U.S. PATENT DOCUMENTS

| 7,655,335 | B2 | 2/2010 | Choi et al. | |
|---|---|---|---|---|
| 2002/0132151 | A1* | 9/2002 | Choi | 429/32 |
| 2003/0198853 | A1 | 10/2003 | Choi et al. | |
| 2004/0166393 | A1* | 8/2004 | Akita et al. | 429/38 |
| 2005/0098217 | A1* | 5/2005 | Cho et al. | 137/565.01 |
| 2006/0127741 | A1 | 6/2006 | Muller et al. | |
| 2007/0059578 | A1* | 3/2007 | Kweon | 429/34 |

FOREIGN PATENT DOCUMENTS

| EP | 1 349 227 A2 | 10/2003 |
|---|---|---|
| EP | 1 357 627 A2 | 10/2003 |
| EP | 1 429 406 A1 | 6/2004 |
| EP | 1 513 211 A2 | 3/2005 |
| JP | 2000-268836 | 9/2000 |

(Continued)

OTHER PUBLICATIONS

Sato, M., Machine translation of JP 2002-298874 A, Oct. 2002.*
Okuyama, R., Machine translation of JP 2005-129261 A, May 2005.*
Patent Abstracts of Japan, Publication No. 2004-146370; Date of Publication: May 20, 2004; in the name of Takashi Matsuoka et al.
Patent Abstracts of Japan, Publication No. 2005-228687; Date of Publication: Aug. 25, 2005; in the name of Satoshi Shibuya et al.

(Continued)

*Primary Examiner* — Basia Ridley
*Assistant Examiner* — Sean P Cullen
(74) *Attorney, Agent, or Firm* — Christie, Parker & Hale, LLP (57) ABSTRACT

A fuel cell is provided. The fuel cell includes a medium member. Unit areas are formed at both sides of the medium member. The unit areas include outlets and inlets which allow a fuel to flow. First path members which have first flowpaths for circulating the fuel are disposed at the unit areas. Membrane-electrode assemblies are connected to the respective first path members. Second path members which have second flowpaths for circulating air are connected to the respective membrane-electrode assemblies.

33 Claims, 8 Drawing Sheets

FOREIGN PATENT DOCUMENTS

| | | |
|---|---|---|
| JP | 2002-56855 | 2/2002 |
| JP | 2002-298874 | 10/2002 |
| JP | 2003-282131 | 10/2003 |
| JP | 2003-317745 | 11/2003 |
| JP | 2004-146370 | 5/2004 |
| JP | 2005-085763 | 3/2005 |
| JP | 2005-129261 | 5/2005 |
| JP | 2005-228517 | 8/2005 |
| JP | 2005-228687 | 8/2005 |
| KR | 10-2005-0070724 | 7/2005 |
| WO | WO 01/35477 A1 | 5/2001 |
| WO | WO 2004/054024 A1 | 6/2004 |

OTHER PUBLICATIONS

Korean Patent Abstracts, Publication No. 1020050070724 A; Date of Publication: Jul. 7, 2005; in the name of Hyung Seuk Oh.

Extended European Search Report dated Feb. 12, 2008 for corresponding EP Application No. 06121381.5.

Japanese Office action dated May 25, 2010, for corresponding Japanese Patent application 2006-262954.

Chinese Patent Gazette dated Aug. 25, 2010, for corresponding Chinese Patent application 200610064150.4.

JPO Notice of Allowance for corresponding Japanese Patent Application No. 2006-262954, dated Sep. 6, 2011, 3 pages.

* cited by examiner

FUEL CELL AND FUEL CELL SYSTEM WITH THE SAME

CROSS-REFERENCE TO RELATED APPLICATION

This application claims priority to and the benefit of Korean Patent Application No. 10-2005-0090432 filed in the Korean Intellectual Property Office on Sep. 28, 2005, the entire content of which is incorporated herein by reference.

BACKGROUND OF THE INVENTION

1. Field of the Invention

The present invention relates to a fuel cell and a fuel cell system having the fuel cell.

2. Description of the Related Art

The fuel cell is an electricity generating system for directly converting chemical reaction energy of hydrogen contained in a fuel and oxygen which is provided separately from the fuel into electrical energy.

The fuel cell is classified into various types of fuel cells according to components constructing the fuel cell or types of fuel used in the fuel cell. A monopolar fuel cell, which is constructed with a plurality of unit cells which are two-dimensionally disposed, provides fuel and oxygen to the unit cells in order to generate electrical energy.

The monopolar fuel cell known in the art is supplied with oxygen through one side of the fuel cell main body constructed with the unit cells. Supplying oxygen through only one side of the fuel cell main body does not allow the fuel cell to operate at its maximum efficiency and makes it difficult to cool the unit cells, which emit heat. Therefore, supplying oxygen through only one side of the fuel cell main body reduces the fuel cell performance reliability and increases the safety danger to users of the fuel cell.

Recently, lightweight, compact, and high-tech electronic devices such as a telecommunication mobile terminal, a portable multimedia player (PMP), a playstation portable (PSP), and a personal digital assistants (PDA) have been developed.

As a power source of the electronic device, rechargeable batteries are generally used. However, existing rechargeable batteries cannot cope with the high power consumption of the recently developed electronic devices.

Therefore, in the fuel cell art, a fuel cell system which can maximize an output of electrical energy and can be easily used and carried with the electronic device is required.

SUMMARY OF THE INVENTION

In order to solve the aforementioned problem, the present invention provides a fuel cell which can maximize an output of electrical energy with a simple structure and is safe to use.

In addition, the present invention also provides a fuel cell system having the aforementioned fuel cell.

According to an aspect of the present invention, a fuel cell is provided that includes a separator that is adapted to allows a fuel to flow to both sides of the separator. Anode portions are disposed at both sides of the separator to interpose the separator, the anode portions being adapted to allow the fuel to circulate. Membrane-electrode assemblies are disposed in close contact with the anode portions. Cathode portions are disposed in close contact with the membrane-electrode assemblies and are adapted to allow air to circulate through the cathode portions.

The cathode portions may be exposed to the air.

The separator may have an insulating property and may be constructed to have a plate type.

The anode portion disposed at one side of the separator, the membrane-electrode assembly, and the cathode portion may constitute an electricity generator in units of a cell for generating electrical energy by a reaction of the fuel and the air.

The electrical generators may be disposed facing each other such that the separator is interposed between the electrical generators.

A plurality of the electricity generators may be disposed along a longitudinal direction of the separator at predetermined intervals.

The anode and the cathode portions may include current collectors for collecting the corresponding currents.

The anode and cathode portions may include current collectors for collecting the corresponding currents, and the anode and cathode portions which are adjacent each other may be electrically connected.

The anode portion may include a flowpath to circulate the fuel.

The cathode portion may include air vents to circulate the air.

According to another aspect of the present invention, a fuel cell is provided including a medium member including unit areas formed at both sides of the medium member, the unit area including an outlet and an inlet which allow a fuel to flow; first path members which have first flowpaths for circulating the fuel and are disposed at the unit areas; membrane-electrode assemblies which are connected to the respective first path members; and second path members which have second flowpaths for circulating air and are connected to the respective membrane-electrode assemblies.

The second path member may be exposed to the air.

The first and second path members may include current collectors for collecting the corresponding currents.

The first and second path members may include terminal portions protruding from edge portions of the respective current collectors, and the terminal portions of the first and second path members may be electrically connected.

The terminal portions of the first and second path members may be connected by soldering.

The medium member may be formed in a plate type, and a plurality of the unit areas may be disposed at predetermined intervals along the longitudinal direction of the medium member.

The outlets and the inlets corresponding to a plurality of the unit areas may form a manifold, and the medium member may include a fuel pathway connected to the manifold.

The medium member may be provided with engaged notches which are engaged with the first path member, and the medium member may be partitioned into the unit areas by the engaged notches.

The medium member may be divided into a first part and a second part which constitute the medium member in one body, and the fuel pathway may be formed on the inside of the medium member by integrating a first and second notches formed in the first and second part with each other, respectively.

The fuel pathway may include a first pathway connected to the outlet and a second pathway connected to the inlet.

The medium member may include a fuel injecting portion through which the fuel is injected into the first pathway and a fuel discharging portion from which the fuel passing through the second pathway is discharged.

The first flowpath may be formed to connect the outlet and the inlet.

The first flowpath may be formed in a meander shape.

The second flowpath may be formed as a plurality of air vents.

The fuel cell may further include an end plate which has an opening that is used to expose the second path member to the atmosphere, closely contacts the second path member, and is engaged with the medium member.

The opening may have a size corresponding to a size of the second path member.

The end plate may include a snag pressing the edge portion of the second path member.

The end plate may include a tightening member that is used to integrate or remove the end plate into or from the medium member.

According to another aspect of the present invention, a fuel cell system is provided including a fuel cell including a plurality of electricity generators for generating electrical energy by a reaction of a fuel and air; and a fuel supply device for supplying the fuel to the fuel cell. In addition, the electricity generators are disposed at both sides of the fuel cell at predetermined intervals along a longitudinal direction of the fuel cell, and a side of the electricity generator through which the air is supplied is exposed to the atmosphere.

The fuel cell may include a separator allowing the fuel to circulates, and the electricity generators may be disposed at both sides of the separator to interpose the separator therebetween while facing each other.

The cathode portion may be disposed toward the outside of the separator.

DETAILED DESCRIPTION OF THE EMBODIMENTS

Figure 1:
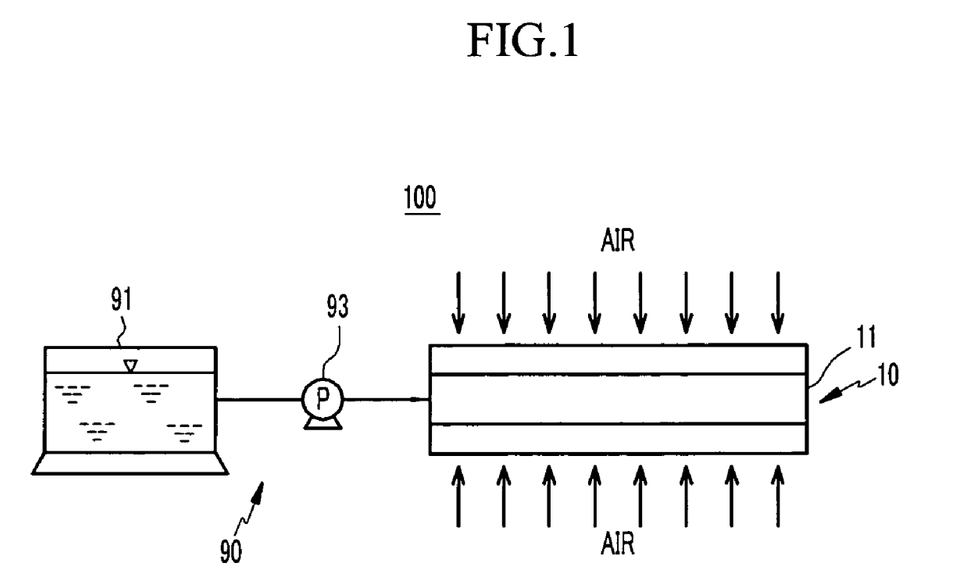
FIG. 1 is a block diagram schematically showing a structure of a fuel cell system according to an embodiment of the present invention.

FIG. 1 is a block diagram schematically showing a structure of a fuel cell system according to an embodiment of the present invention.

A fuel cell system 100 according to an embodiment of the present invention is described with reference to FIG. 1. The fuel cell system 100 is a generating system which is connected to a predetermined electronic device through a cable or is integrated with an electronic device in one body to generate electrical energy by electro-chemical reaction of a fuel and oxygen. The fuel cell system 100 outputs electrical energy to the electronic device.

A portable multimedia player (PMP), a playstation portable (PSP), a personal digital assistants (PDA), an MPEG audio player-3 (MP3), and a telecommunication mobile terminal are examples of electronic devices.

The fuel cell system 100 according to the embodiment is constructed as a direct oxidation fuel cell such as a direct methanol fuel cell (DMFC) which is directly supplied with an alcohol-based fuel such as methanol and ethanol, and air to generate electrical energy by an oxidation reaction of hydrogen contained in the fuel and a reduction reaction of oxygen contained in the air, but the fuel cell system according to the present invention is not limited thereto.

The fuel cell system according to the present invention may be constructed as a generating system which uses a reformer to generate a reformed gas containing hydrogen from a fuel and which supplies the reformed gas to the fuel cell in order to generate electrical energy. A polymer electrolyte membrane fuel cell (PEMFC) is an example of such a system.

Accordingly, the fuel cell system according to the present invention includes a fuel cell having a proper type according to the system thereof.

The fuel cell system 100 in the embodiment includes a fuel cell 10 and a fuel supply device 90 for supplying a fuel to the fuel cell 10.

In the current embodiment, the fuel cell 10 includes a fuel cell main body 11 having a plate type which is supplied with a fuel from the fuel supply device 90 and air in the atmosphere by convection and diffusion to generate electrical energy by an oxidation reaction of the fuel and a reduction reaction with the air. In this case, the fuel cell 10 has a structure in that the fuel cell main body 11 is supplied with air in the atmosphere through both sides thereof. A detailed structure of the fuel cell 10 will be further described later with reference to FIGS. 2 and 3.

The fuel supply device 90 includes a fuel tank 91 for storing the fuel and a fuel pump 93 for discharging the fuel stored in the fuel tank 91 by a predetermined pumping pressure.

The fuel tank 91 may be constructed to be removable from the body of one of the aforementioned electronic devices, which is not shown, by an additional mounting means. For example, the fuel tank 91 may be constructed in a cartridge system so as to be refilled with a fuel.

In addition, the fuel pump 93 is also constructed to be connected to the fuel cell main body 11 and the fuel tank 91 through a pipe line so as to be mounted to the body of the aforementioned electronic device.

Figure 2:
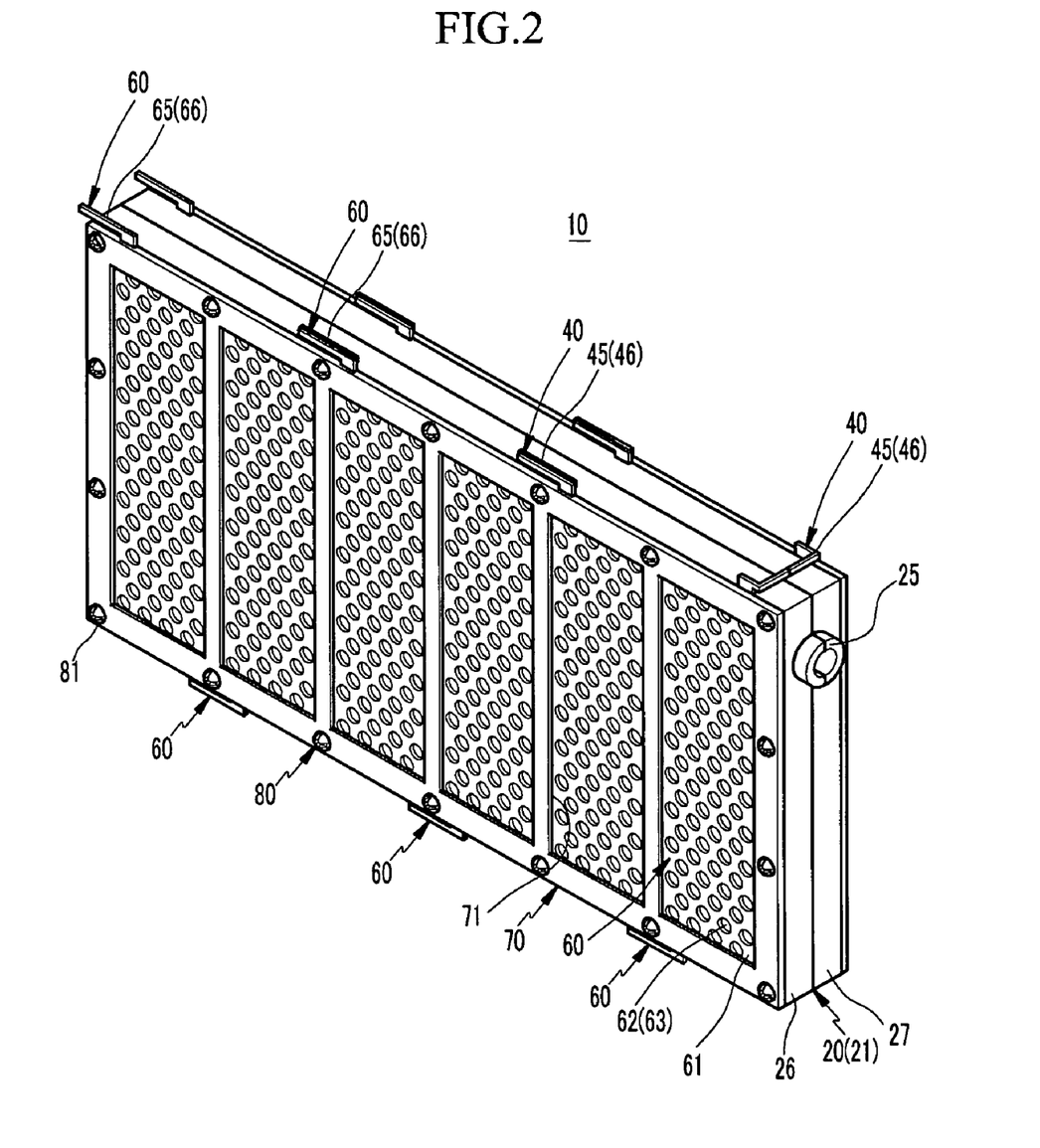
FIG. 2 is a perspective view showing a fuel cell according to an embodiment of the present invention.
Figure 3:
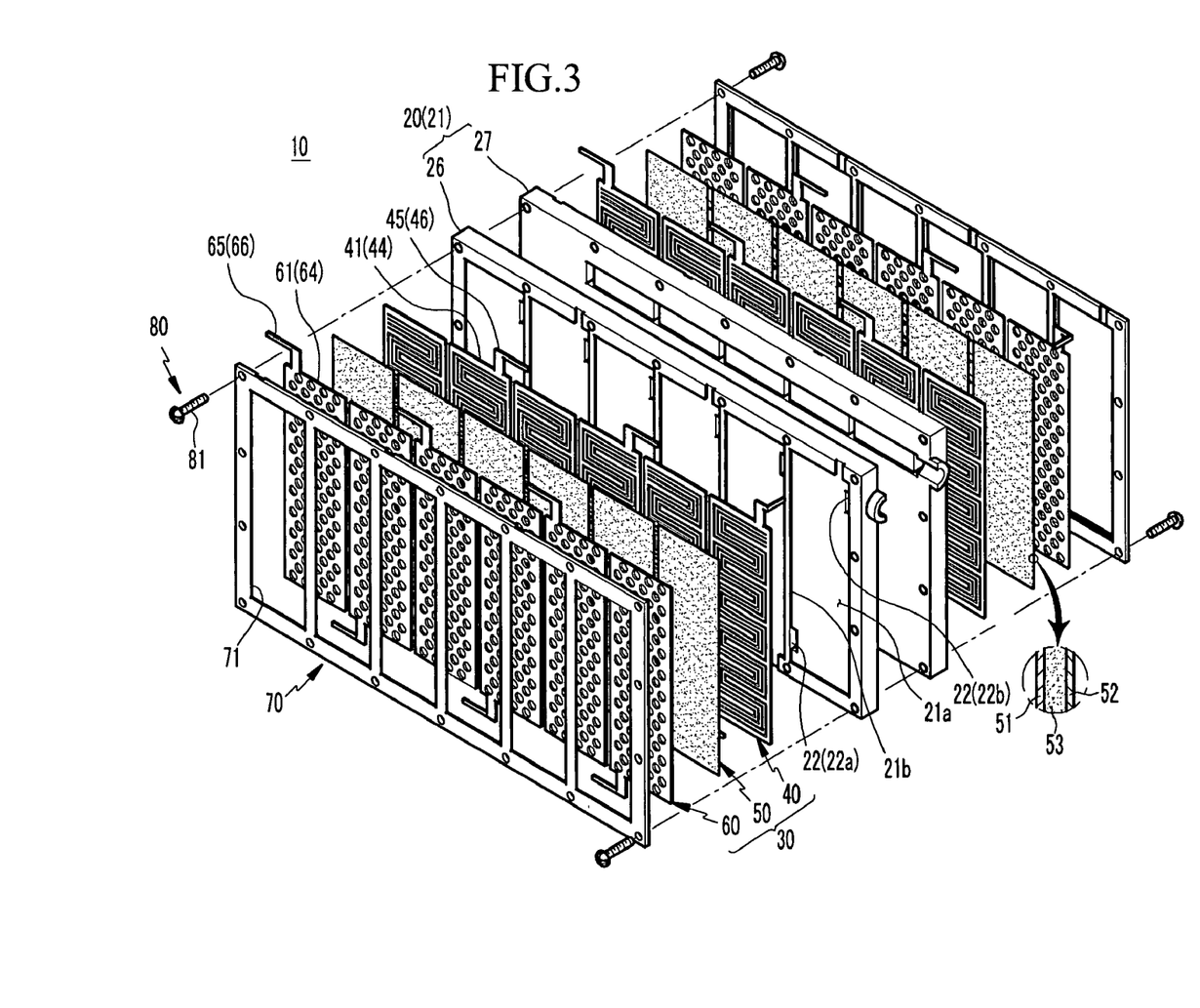
FIG. 3 is an exploded perspective view showing the fuel cell shown in FIG. 2.

FIG. 2 is a perspective view showing a fuel cell according to an embodiment of the present invention. FIG. 3 is an exploded perspective view showing the fuel cell shown in FIG. 2.

Referring to FIGS. 2 and 3, the fuel cell 10 includes a separator 20 and a plurality of electricity generators 30 which are correspondingly formed at both sides of the separator 20 so as to be interposed therebetween.

The separator 20 has a function of partitioning the electricity generators 30 formed at both sides thereof. The separator 20 has an insulating property in which electricity is prevented from flowing and includes a medium member 21 having a plate type capable of allowing the fuel to flow to both sides thereof. A structure of the medium member 21 will be further described later with reference to FIGS. 4 and 5.

The aforementioned electricity generators 30 are disposed at both sides of the medium member 21 and are disposed at predetermined intervals therebetween in a longitudinal direction of the medium member 21. The electricity generators 30 constitute a fuel cell in units of a cell for generating electrical energy by a reaction of the fuel and the air.

The electricity generators 30 include anode portions 40 disposed in close contact with both sides of the medium member 21, membrane-electrode assemblies (MEAs) 50 disposed in close contact with the corresponding anode portions 40, and cathode portions 60 disposed in close contact with the corresponding MEAs 50.

More specifically, in the structure of the fuel cell 10, the medium member 21 has a rectangular shape. The longitudinal direction of the medium member 21 represents a direction of the long side of the medium member 21.

Figure 4:
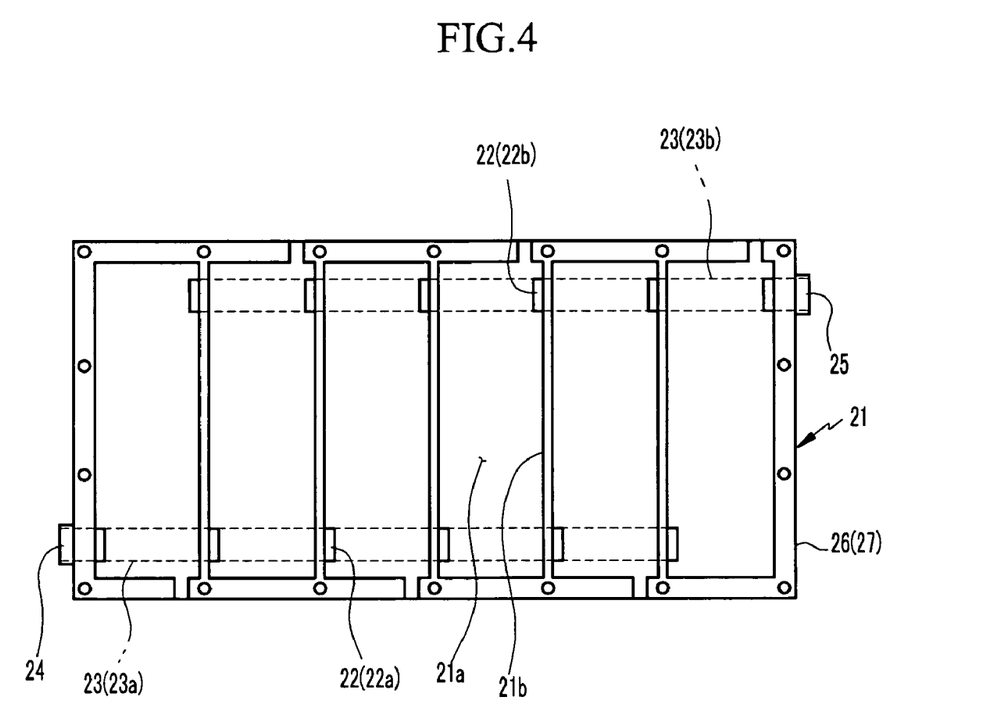
FIG. 4 is a front view showing a medium member of the fuel cell shown in FIG. 3.

In the current embodiment, a plurality of unit areas 21a are formed on both sides of the medium member 21 as shown in FIG. 4. The unit areas 21a are sequentially formed on the medium member 21 and partitioned at predetermined intervals therebetween.

The unit area 21a is provided with a manifold 22 which allows the fuel to flow to the anode portion 40 which will be further described later. In addition, the inside of the medium member 21 is provided with a fuel pathway 23 which is connected with the manifold 22.

The aforementioned unit area 21a is a section where an electricity generator 30 in a unit of a cell is disposed. The unit area 21a represents an active area where a reaction of the fuel and the air occurs.

The unit areas 21a are formed on both sides of the medium member 21 in a direction of the short side of the medium member 21, and are arranged in the direction of the long side of the medium member 21 at predetermined intervals. The unit areas 21a are partitioned by engaged notches 21b that are used to engage the unit areas 21a with the anode portions 40.

More specifically, portions excluding the engaged notches 21b in both sides of the medium member 21 protrude. Therefore, the unit area 21a may be a space in the protruded portions.

The fuel pathway 23 is formed inside the medium member 21 in the direction of the long side. The fuel pathway 23 includes a first pathway 23a through which the fuel supplied by fuel supply device 90 flows and a second pathway 23b through which the fuel passed through the anode portion 40 flows. In this case, the first pathway 23a is formed along the lower edge portion of the medium member 21, and the second pathway 23b is formed along the upper edge portion of the medium member 21 in a parallel direction with the first pathway 23a.

In the current embodiment, the manifold 22 is formed in each unit area 21a of the medium member 21. The manifold 22 is provided with an outlet 22a connected to the first pathway 23a of the fuel pathway 23 and an inlet 22b connected to the second pathway 23b thereof.

The outlet 22a allows the fuel passing through the first pathway 23a to flow out to a flowpath of the anode portion 40 that will be further described later. The inlet 22b allows the fuel passing through the anode portion 40 to flow into the second pathway 23b.

In addition, the medium member 21 is provided with a fuel injecting portion 24 that is used to inject the fuel into the first pathway 23a at an end portion thereof and a fuel discharging portion 25 that is used to discharge the fuel passing through the second pathway 23b at the other end portion thereof. In this case, the fuel injecting portion 24 may be connected to the fuel pump 93 through a conventional pipeline or the like.

Figure 5:
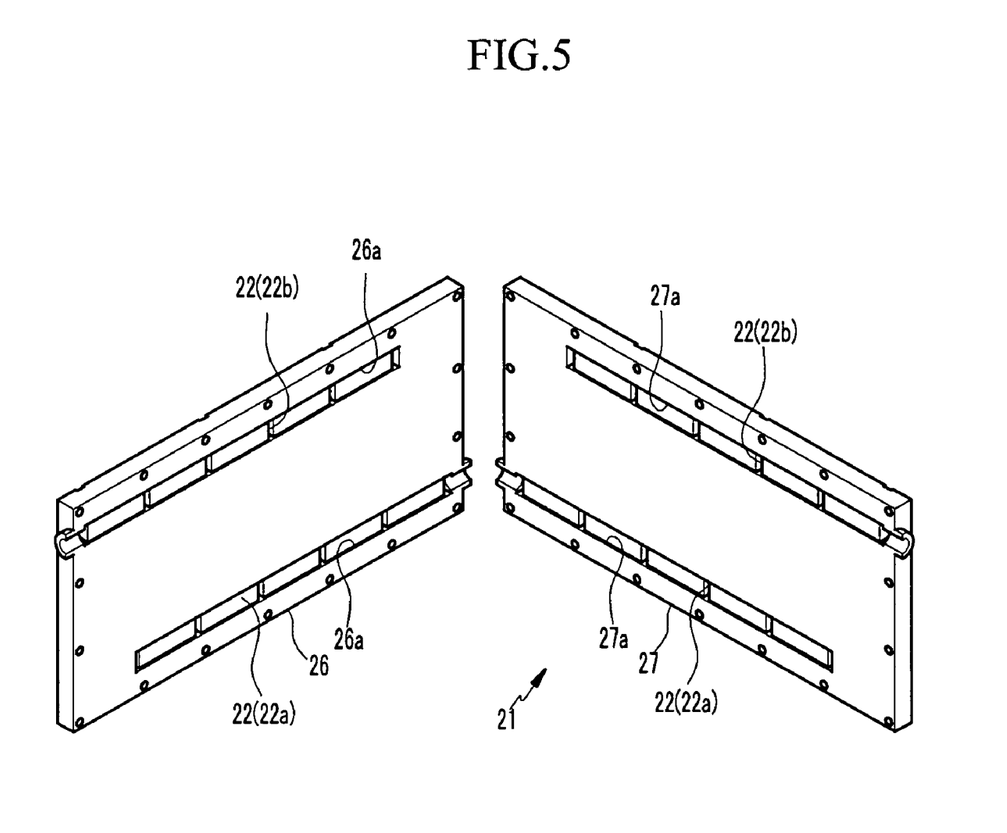
FIG. 5 is an exploded perspective view showing a medium member of the fuel cell shown in FIG. 3.

The medium member 21 having the aforementioned construction is divided into two parts, that is, a first portion 26 and a second portion 27 as shown in FIG. 5. The first portion and second portions 26 and 27 are attached in one body to form the fuel pathway 23 as shown in FIG. 4. More specifically, one side of the first portion 26 is provided with first notches 26a corresponding to the first and second pathways 23a and 23b of the fuel pathway 23. Similarly, one side of the second portion 27 is also provided with second notches 27a corresponding to the first and second pathways 23a and 23b of the fuel pathway 23. Here, the other sides of the first and second portions 26 and 27 are provided with the plurality of the unit areas 21a described above.

Therefore, the medium member 21 according to the embodiment can form the fuel pathway 23 on the inside thereof by integrating one side of the first and second portions 26 and 27 to be faced with each other.

Hereinafter, constructions of the electricity generators 30 which are disposed at both sides of the medium member 21 at predetermined intervals therebetween will be described in detail with reference to FIGS. 2 and 3.

The electricity generator 30 includes an MEA 50, an anode portion 40 and a cathode portion 60 which are disposed in close contact with both sides of the MEA 50 so as to be interposed between the anode and cathode portions 40 and 60.

A first electrode layer 51 forms one side of the MEA 50, a second electrode layer 52 forms the other side of the MEA 50, and an electrolyte membrane 53 is formed between the two electrode layers 51 and 52, thereby constituting a conventional MEA.

In the first electrode layer 51, hydrogen contained in the fuel is decomposed into electrons and hydrogen ions, and in the electrolyte membrane 53, the hydrogen ions move to the second electrode layer 52, and in the second electrode layer 52, the electrons and hydrogen ions supplied from the first electrode layer 51 are reacted with oxygen supplied additionally to generate water and heat.

In the current embodiment, the MEA 50 has a size corresponding to the anode and cathode portions 40 and 60 and may include a conventional gasket (not shown) at the edge portion thereof.

The anode portions 40 closely contact the first electrode layers 51 of the MEAs 50 and are disposed at the unit areas 21a while maintaining predetermined intervals from both sides of the medium member 21.

In the anode portion 40, the fuel circulates to be distributed and supplied to the first electrode layer 51 of the MEA 50. In addition, the anode portion 40 has a function of a conductor such that electrons decomposed from the hydrogen contained in the fuel by the first electrode layer 51 move to the adjacent cathode portion 60 of the electricity generator 30.

Figure 6:
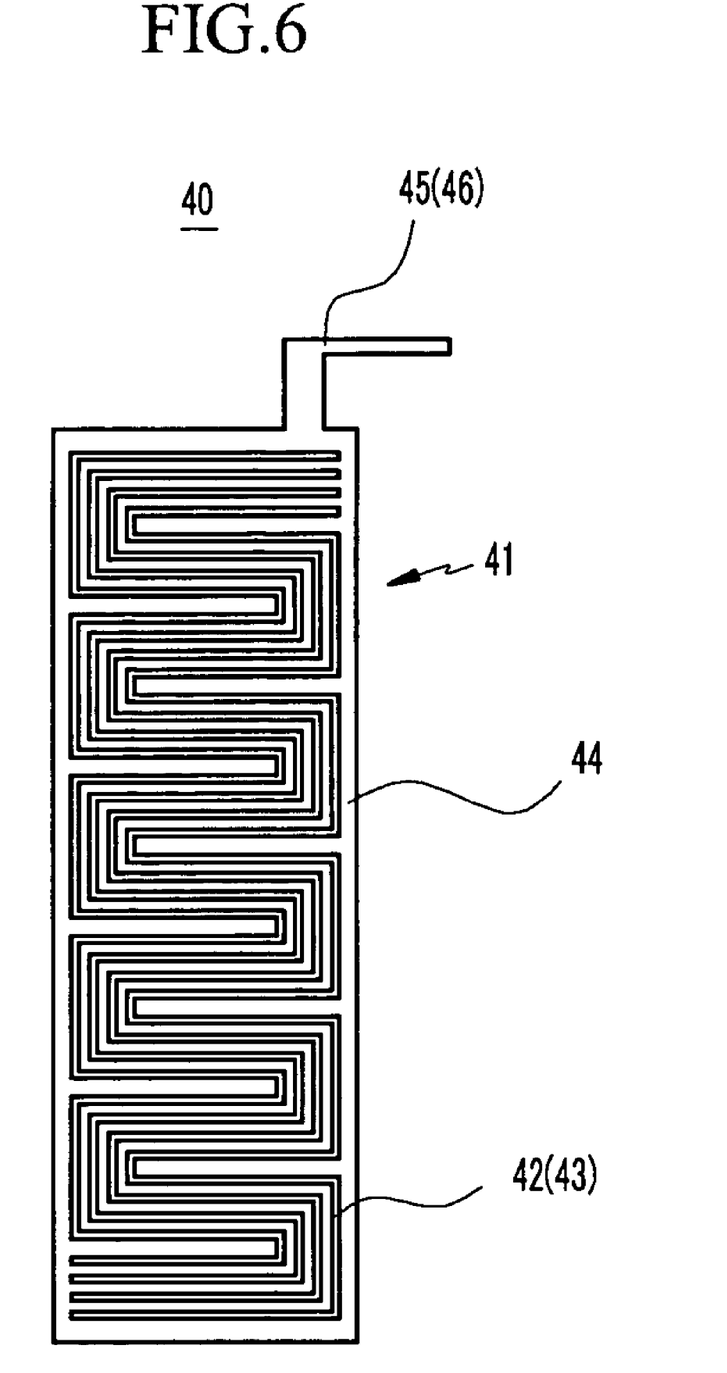
FIG. 6 is a front view showing an anode portion of the fuel cell shown in FIG. 3.

Therefore, the anode portion 40 includes a first flowpath 42 through which the fuel circulates and a first path member 41 disposed at each unit area 21a of the medium member 21 as shown in FIG. 6.

The first path member 41 is constructed with a metal plate having conductivity characteristics. The first path member has a size corresponding to the MEA 50 and is engaged with the engaged notch 21b of each unit area 21a.

In the current embodiment, the first path member 41 has a function of a conductor such that electrons move to the adjacent cathode portion 60 of the electricity generator 30 as described above. Therefore, the first path member 41 is constructed as a current collector 44 for collecting currents having an opposite polarity to that of the cathode portion 60.

Therefore, the first path member 41 is provided with a terminal portion 45 which is electrically connected to the adjacent cathode portion 60 of the electricity generator 30 through lead wires. The terminal portion 45 is constructed to be integrated into the first path member 41 in one body and includes a protrusion 46 extending outwardly from the edge portion of the medium member 21. In this case, the protrusion 46 protrudes from an end portion of the first path member 41. The protrusion 46 is constructed to be aligned with the corresponding protrusion 46 of the adjacent first path member 41.

The first flowpath 42 is constructed as a plurality of flowpaths 43 for connecting the manifold 22. That is, the outlet 22a and the inlet 22b are formed in the unit area 21a so that the fuel injected through the first pathway 23a can be circulated.

The first flowpaths 42 are constructed as holes penetrating the first path member 41, and more preferably, are formed in a meander shape such that the holes extend in a straight line at predetermined intervals therebetween and the extending holes at edge portions of the first path member 41 are connected in an alternate position. In this case, the first path member 41 are engaged with the engaged notch 21b of the unit area 21a, so that an end portion of the first flowpath 42 is connected to the outlet 22a of the manifold 22 and the other end portion is connected to the inlet 22b of the manifold 22.

In the current embodiment, the cathode portion 60 closely contacts the second electrode layer 52 of the MEA 50, and is engaged with an end plate 70 which will be further described later at a predetermined interval therefrom.

In the cathode portion 60, air in the atmosphere flows by diffusion or convection such that the air is distributed and supplied to the second electrode layer 52 of the MEA 50. In addition, the cathode portion 60 has a function of a conductor such that the cathode portion 60 can be supplied with electrons from the anode portion 40 of the electricity generator 30.

Figure 7:
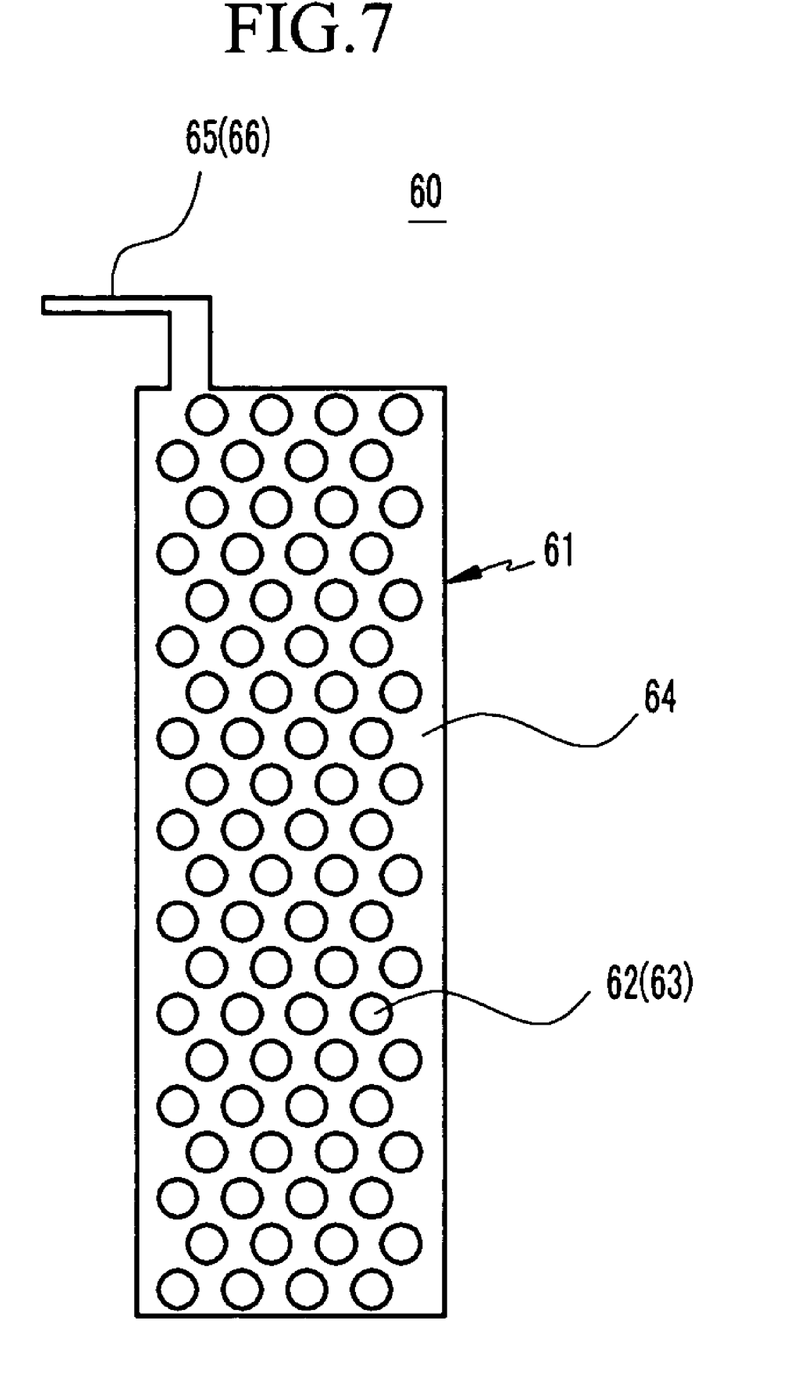
FIG. 7 is a front view showing a cathode portion of the fuel cell shown in FIG. 3.

For the aforementioned construction, the cathode portion 60 is constructed with a metal plate having conductivity characteristics as shown in FIG. 7, and includes a second path member 61 having a second flowpath 62 so that the air is distributed and supplied to the second electrode layer 52 of the MEA 50.

In this case, the second path member 61 has a size corresponding to the first path member 41 and the MEA 50. In addition, the second flowpaths 62 are constructed as holes penetrating the second path member 61, and in an exemplary embodiment, include a plurality of air vents 63 having a shape of a circle at the entire second path member 61.

In addition, the second path member 61 has a function of a conductor such that the second path member 61 is supplied with electrons from the adjacent anode portion 60 of the electricity generator 30 as described above. Therefore, the second path member 61 is constructed as a current collector 64 for collecting currents having the opposite polarity to that of the anode portion 40.

The second path member 61 includes a terminal portion 65 which is electrically connected to the adjacent anode portion 40 of the electricity generator 30, that is, the terminal portion 45 of the first path member 41 through lead wires or the like. The terminal portion 65 is constructed to be integrated into the second path member 61 in one body and includes a protrusion 66 extending outwardly from the edge portion of the medium member 21. In this case, the protrusion 66 protrudes from an end portion of the second path member 61. The protrusion 66 is constructed to be aligned with the corresponding protrusion 66 of the adjacent first path member 41. More specifically, the protrusion 66 of the second path member 61 is interposed between the protrusions 46 of the first path member 41 with respect to both sides of the medium member 21.

In the embodiment, the terminal portions 45 and 65 of the first and second path member 45 and 65 are electrically connected overlapping each other by soldering.

In the construction, the anode and cathode portions 40 and 60 included in the fuel cell 10 are electrically connected in series. For practical electrical circuit constructions, the terminal portions 65 and 45 of the cathode and anode portions 60 and 40 which are disposed at an end portion (to the left of the figure) of the medium member 21 to face each other protrude, respectively, and the terminal portions 65 and 45 of the cathode and anode portions 60 and 40 which are disposed at the other end portion (to the right of the figure) of the medium member 21 to face each other are contacted and connected by soldering.

The fuel cell 10 according to the embodiment further includes an end plate 70 for fixing the second path member 61 of the cathode portion 60 with respect to both sides of the medium member 21 and firmly attaching the second path member 61 to the MEA 50.

The end plate 70 includes an opening 71 so as to expose the second path member 61 to the atmosphere. The opening 71 has a size corresponding to that of the second path member 61.

Figure 8:
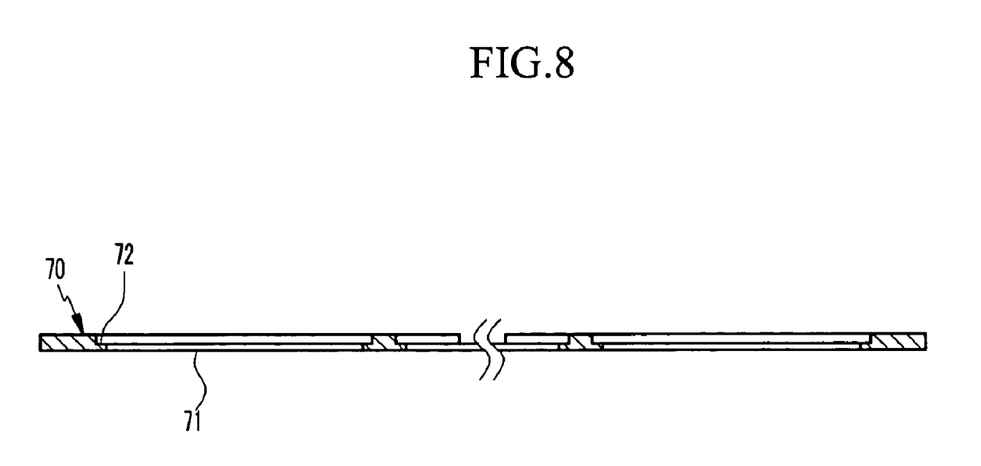
FIG. 8 is a sectional view showing an end plate of the fuel cell shown in FIG. 3.

In addition, the end plate 70 further includes a snag 72 which is formed near the edge portion of the opening 71 as shown in FIG. 8. The snag 72 has a thickness corresponding to that of the second path member 61 such that the position of the second path member 61 is fixed. In addition, the snag 72 presses the edge portions of the second path member 61 such that the second path member 61 is closely contacted with the MEA 50.

In addition, the fuel cell 10 according to the embodiment further includes a plurality of tightening members 80 which is used to integrate the end plate 70 into the medium member 21 in one body.

The tightening members 80 include conventional tightening bolts 81 penetrating a portion in the end plate 70 excluding the opening 71 to be tightened with an area in the medium member 21 excluding the unit area 21a.

A manufacturing process of the fuel cell having the aforementioned construction according to the embodiment of the present invention is described. First, the first path member 41 is fitted to the unit area 21a of the medium member 21.

Here, the first members 41 are engaged with the engaged notches 21b of the unit area 21a with maintaining predetermined intervals therebetween with respect to both sides of the medium member 21. One side of the first path member 41 is closely contacted with the inner surface of the unit area 21a.

In this state, the first electrode layer 51 of the MEA 50 is disposed in close contact with the other side of the first path member 41. Here, the gasket (not shown) formed near the edge portion of the MEA 50 may be disposed on the protruding portion (a portion excluding the unit area) formed at both sides of the medium member 21 and disposed to contact the other side of the first path member 41.

Next, the second path members 61 are fitted to the openings 71 of the end plate 70. More specifically, the second path member 61 is engaged with the snag 72 formed near the edge portion of the opening 71 so as to maintain a fixed state.

Next, the end plate 70 is disposed to contact the protruding portion of the medium member 21. In this case, the second path member 61 maintains in a state of contacting the second electrode layer 52 of the MEA 50.

Next, the tightening member 80 penetrates a portion in the end plate 70 excluding the opening 71 to be tightened with a protruding portion of the medium member 21, that is, an area in the medium member 21 excluding the unit area 21a. The end plate 70 is then tightened with the medium member 21 by the tightening member 80, so that the end plate 70 presses the edge portion of the second path member 61, and the second path member 61 is closely contacted with the second electrode layer 52 of the MEA 50.

Accordingly, the manufacturing of the fuel cell 10 according to the embodiment of the present invention is completed through the aforementioned process. The cathode portion 60 of each electricity generator 30, that is, the air vents 63 of the second path member 61 of the fuel cell 10 are exposed to the atmosphere through the openings 71 of the end plate 70.

The fuel cell 10 may be accommodated into an additional case (not shown). In this case, the case is provided with a plurality of holes at both sides thereof. As a result, the cathode portion 60 of the electricity generator 30, that is, the air vents 63 of the second path member 61 are exposed to the atmosphere.

Operations of the fuel cell system 100 employing the fuel cell 10 manufactured as described above according to the embodiment of the present invention will be described.

First, the fuel cell 10 according to the embodiment is connected to a predetermined electronic device through a cable or integrated into the electronic device in one body. The cathode portion 60 of each electricity generator 30 is exposed to the atmosphere.

In this state, the fuel pump 93 discharges the fuel stored in the fuel tank 91 and supplies the fuel to the first pathway 23$a$ of the medium member 21. In this case, the fuel is supplied to the first pathway 23$a$ through the fuel injecting portion 24 of the medium member 21.

Next, the fuel passing through the first pathway 23$a$ flows out through outlet 22$a$ of the manifold 22 and circulates along the first flowpath 42 of the first path member 41 to be distributed and supplied to the first electrode layer 51 of the MEA 50. In this case, a fuel that is not supplied to the first electrode layer 51 of the MEA 50 while circulating along the first flowpath 42 of the first path member 41 flows into the second pathway 23$b$ of the medium member 21 through the inlet 22$b$ of the manifold 22 and is discharged from the medium member 21 through the fuel discharging portion 25 after passing the second pathway 23$b$.

In the meanwhile, the cathode portion 60 of each electricity generator 30, that is, the air vents 63 of the second path member 61 are exposed to the atmosphere, so that air in the atmosphere flows through the air vents 63 of the second path member 61 by diffusion or convection to be distributed and supplied to the second electrode layer 52 of the MEA 50.

Therefore, in the first electrode layer 51 of the MEA 50, hydrogen contained in the fuel is decomposed into electrons and hydrogen ions (protons) through an oxidation reaction of the fuel. In this case, the hydrogen ions move to the second electrode layer 52 through the electrolyte membrane 53 of the MEA 50. The electrons cannot pass through the electrolyte membrane 53 and move to the second path member 61 of the adjacent electricity generator 30 through the first path member 41. More specifically, because the protrusion 46 of the first path member 41 is electrically connected to the adjacent protrusion 66 of the second path member 61 of the electricity generator 30, the electrons move to the adjacent second path member 61 of the electricity generator 30 through the first path member 41.

Through the processes, the fuel cell 10 according to the embodiment can generate current by the movements of the aforementioned electrons. In addition, because the first and second path members 41 and 61 of each electricity generator 30 are constructed as current collectors 44 and 64 for collecting currents, electrical energy having a predetermined potential difference can be output to the electronic device.

In the second electrode layer 52, the hydrogen ions which move to the second electrode layer 52 through the electrolyte membrane 53 of the MEA 50, electrons which move to the second path member 61 through the first path member 41, and the air which supplied to the second electrode layer 52 of the MEA 50 through the air vents 63 of the second path member 41 are reacted. Therefore, in the cathode portion 60 of each electricity generator 30, heat and water is generated by the reaction.

Accordingly, the cathode portion 60 of each electricity generator 30 of the fuel cell main body 10 according to the embodiment can be maintained in an exposed state to the atmosphere through both sides of the fuel cell main body 11 (FIG. 1), so that the air is properly supplied to the cathode portion 60 to maximize outputs of the electricity generators 30. In addition, heat generated in the cathode portions 60 of the electricity generators 30 can be easily emitted to the atmosphere.

According to the present invention as described above, the cathode portion of the electricity generator is constructed to be exposed to the atmosphere through both sides of the fuel cell main body, so that the cathode portion is properly supplied with the air without regard to the proximity of a user.

Therefore, according to the present invention, the output of electrical energy can be maximized, and stability against a temperature increase of the fuel cell main body can be guaranteed. Accordingly, it is possible to improve a performance and reliability of the fuel cell.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, such modifications fall within the scope of the present invention.

What is claimed is:

1. A fuel cell comprising:
   a separator having two sides, the separator being adapted to allow a fuel to flow to both sides of the separator;
   anode portions disposed at both sides of the separator so that the separator is interposed between the anode portions along a stacking direction, each of the anode portions comprising a path member having channels forming a flowpath therein for the fuel to flow along a plane of the anode portions, the plane of the anode portions being perpendicular to the stacking direction;
   membrane-electrode assemblies disposed in close contact with the anode portions; and
   cathode portions disposed in close contact with the membrane-electrode assemblies, the cathode portions being adapted to allow air to circulate through the cathode portions,
   wherein the separator comprises a first fuel pathway configured to supply the fuel to the anode portions and a second fuel pathway separated from the first fuel pathway and configured to discharge the fuel from the anode portions.

2. The fuel cell of claim 1, wherein the cathode portions are exposed to the air.

3. The fuel cell of claim 1, wherein the separator has an insulating property and is constructed to have a plate type.

4. The fuel cell of claim 1, wherein one of the anode portions, one of the membrane-electrode assemblies, and one of the cathode portions are each disposed on the same side of the separator and constitute an electricity generator in units of a cell for generating electrical energy by a reaction of the fuel and the air.

5. The fuel cell of claim 4, wherein a first electricity generator is disposed to one side of the separator and a second electricity generator is disposed on the other side of the separator, the first electricity generator and the second electricity generator being disposed such that their respective anode portions are adjacent to the separator.

6. The fuel cell of claim 5, wherein a plurality of electricity generators are disposed along a longitudinal direction of the separator at predetermined intervals.

7. The fuel cell of claim 6, wherein the anode portions and the cathode portions comprise current collectors for collecting corresponding currents, and the anode portions and the cathode portions adjacent to each other are electrically connected.

8. The fuel cell of claim 1, wherein the anode portions and the cathode portions comprise current collectors for collecting corresponding currents, the anode portions being adapted to collect current flowing in a first direction and the cathode portions being adapted to collect current flowing in a second direction opposite to the first direction.

9. The fuel cell of claim 8, wherein the cathode portions comprise air vents to circulate the air.

10. A fuel cell comprising:
a medium member including unit areas formed at opposite planar sides of the medium member, the unit areas including outlets that allow a fuel to flow out of the unit areas and inlets that allow the fuel to flow into the unit areas;
first path members disposed at the unit areas and facing respective ones of the opposite planar side, the first path members comprising a metal plate comprising current collectors and having channels forming first flowpaths for the fuel to flow along a plane of the current collectors, the plane of the current collectors being parallel to the planar sides;
membrane-electrode assemblies connected to the respective first path members; and
second path members connected to the respective membrane-electrode assemblies, the second path members having second flowpaths for circulating air,
wherein the medium member comprises a first fuel pathway coupled to at least one of the inlets and a second fuel pathway, separated from the first fuel pathway, coupled to at least one of the outlets.

11. The fuel cell of claim 10, wherein the second path members are exposed to the air.

12. The fuel cell of claim 11, further comprising end plates having an opening used to expose the second path members to the air, the end plates closely contacting the second path members and engaging the medium member.

13. The fuel cell of claim 12, wherein the opening has a size corresponding to a size of the second path members.

14. The fuel cell of claim 13, wherein the end plates comprise a snag pressing edge portions of the second path members.

15. The fuel cell of claim 12, wherein the end plates comprise a tightening member used to integrate the end plates into the medium member or to remove the end plates from the medium member.

16. The fuel cell of claim 10, wherein the first path members are adapted to collect current flowing in a first direction and the second path members are adapted to collect current flowing in a second direction opposite to the first direction.

17. The fuel cell of claim 16,
wherein the first path members and the second path members comprise terminal portions protruding from edge portions of the respective current collectors, and
wherein the terminal portions of the first path members and the second path members are electrically connected.

18. The fuel cell of claim 17, wherein the terminal portions of the first path members and the second path members are connected by soldering.

19. The fuel cell of claim 10,
wherein the medium member is formed in a plate type, and
wherein a plurality of the unit areas are disposed at predetermined intervals along a longitudinal direction of the medium member.

20. The fuel cell of claim 19,
wherein the outlets and the inlets corresponding to the plurality of the unit areas form a manifold, and
wherein the first fuel pathway and the second fuel pathway are connected to the manifold.

21. The fuel cell of claim 20,
wherein the medium member is divided into a first part and a second part, and
wherein the first fuel pathway is formed on the inside of the medium member by integrating first notches and second notches formed in the first part and the second part with each other, respectively.

22. The fuel cell of claim 21, wherein the second fuel pathway is formed on the inside of the medium member by integrating third notches and fourth notches formed in the first part and the second part with each other, respectively.

23. The fuel cell of claim 20, wherein the medium member comprises a fuel injecting portion through which the fuel is injected into the first fuel pathway and a fuel discharging portion from which the fuel passing through the second fuel pathway is discharged.

24. The fuel cell of claim 10,
wherein the medium member is provided with engaged notches which are engaged with the first path members, and
wherein the medium member is partitioned into the unit areas by the engaged notches.

25. The fuel cell of claim 10, wherein the first flowpaths connect the outlets and the inlets.

26. The fuel cell of claim 25, wherein the first flowpaths are in a meander shape.

27. The fuel cell of claim 10, wherein the second flowpaths are formed as a plurality of air vents.

28. A fuel cell system comprising:
a fuel cell comprising a medium member and a plurality of electricity generators for generating electrical energy by a reaction of a fuel and air, the medium member having two sides, the two sides facing the electricity generators and being parallel to one another; and
a fuel supply device for supplying the fuel to the fuel cell,
wherein the electricity generators are disposed at both sides of the medium member at predetermined intervals along a longitudinal direction of the fuel cell, and a side of the electricity generator through which the air is supplied is exposed to the atmosphere and
wherein each of the plurality of electricity generators comprises an anode portion, the anode portion comprising a metal plate comprising a path member having channels forming a flowpath therein for the fuel to flow along a plane of the anode portion, the plane of the anode portion being parallel to the two sides,
wherein the medium member comprises a first fuel pathway configured to supply the fuel to the anode portion of each of the plurality of electricity generators and a second fuel pathway separated from the first fuel pathway and configured to discharge the fuel from the anode portions.

29. The fuel cell system of claim 28,
wherein the medium member is adapted to allow the fuel to circulate, and
wherein the electricity generators are disposed facing each other at both sides of the medium member so that the medium member is interposed between the electricity generators.

30. The fuel cell system of claim 29, wherein each of the electricity generators further comprises:
a membrane-electrode assembly disposed in close contact with the anode portion; and
a cathode portion disposed in close contact with the membrane-electrode assembly, the cathode portion being adapted to allow air to circulate through the cathode portion.

31. The fuel cell system of claim 30,
wherein the cathode portion is disposed to one side of the medium member.

32. The fuel cell system of claim 29, wherein the fuel supply device comprises:
a fuel tank for storing the fuel; and
a fuel pump connected to the medium member and to the fuel tank to supply the fuel stored in the fuel tank to the medium member.

33. The fuel cell system of claim 28, wherein the anode portion comprises a current collector for collecting a current.

* * * * *